United States Patent
Deng

(10) Patent No.: US 10,264,635 B2
(45) Date of Patent: Apr. 16, 2019

(54) RIPPLE SUPPRESSION CIRCUIT AND LIGHT EMITTING DIODE DRIVER

(71) Applicant: Silergy Semiconductor Technology (Hangzhou) LTD, Hangzhou, ZheJiang Province (CN)

(72) Inventor: Jian Deng, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 15/968,896

(22) Filed: May 2, 2018

(65) Prior Publication Data

US 2018/0324913 A1    Nov. 8, 2018

(30) Foreign Application Priority Data

May 5, 2017   (CN) .......................... 2017 1 0313374

(51) Int. Cl.
*H05B 37/02*  (2006.01)
*H05B 33/08*  (2006.01)
*H02M 1/15*   (2006.01)
*H02M 1/14*   (2006.01)

(52) U.S. Cl.
CPC .......... *H05B 33/0815* (2013.01); *H02M 1/15* (2013.01); *H05B 33/0845* (2013.01); *H02M 1/14* (2013.01); *H02M 1/143* (2013.01)

(58) Field of Classification Search
CPC .......... H02M 1/14; H02M 1/15; H02M 1/143; H05B 33/0815

USPC ................................. 315/185 R, 209 R, 291
See application file for complete search history.

(56) References Cited

U.S. PATENT DOCUMENTS

| | | | |
|---|---|---|---|
| 5,708,574 A * | 1/1998 | Crompton | G05F 1/571 323/266 |
| 6,570,368 B2 | 5/2003 | Demizu | |
| 9,564,795 B2 | 2/2017 | Jin et al. | |
| 2011/0080110 A1* | 4/2011 | Nuhfer | H05B 33/0815 315/291 |
| 2014/0085945 A1* | 3/2014 | Kuang | G05F 1/563 363/46 |
| 2014/0176017 A1* | 6/2014 | Kuang | H05B 33/0824 315/307 |
| 2016/0065051 A1* | 3/2016 | Kuang | H02M 1/14 315/186 |
| 2017/0164438 A1* | 6/2017 | Arulandu | H05B 33/0815 |
| 2017/0181234 A1* | 6/2017 | Huang | H05B 33/0815 |
| 2017/0250620 A1 | 8/2017 | White et al. | |

* cited by examiner

*Primary Examiner* — Thuy Vinh Tran
(74) *Attorney, Agent, or Firm* — Michael C. Stephens, Jr.

(57) ABSTRACT

A ripple suppression circuit for suppressing a ripple component in a drive current for an LED load includes: an output port connected to the LED load; a current filter circuit connected in series with the output port, and being configured to control the drive current based on an output voltage after a ripple component is filtered out, where the drive current is maintained as substantially stable; and a ripple shunt circuit connected between a drive current input terminal and a ground terminal, and being configured to shunt the drive current in response to the output voltage, where the output voltage is a voltage output from a power stage circuit that is coupled to the ripple suppression circuit.

13 Claims, 5 Drawing Sheets

US 10,264,635 B2

RIPPLE SUPPRESSION CIRCUIT AND LIGHT EMITTING DIODE DRIVER

RELATED APPLICATIONS

This application claims the benefit of Chinese Patent Application No. 201710313374.2, filed on May 5, 2017, which is incorporated herein by reference in its entirety.

FIELD OF THE INVENTION

The present invention generally relates to power electronic technologies, particularly to the field of light-emitting diode (LED) drivers, and more particularly to ripple suppression circuitry and LED drivers.

BACKGROUND

When a switching power supply with power frequency ripples, or when a frequency that is lower than a power frequency in an output current/voltage, is configured to drive an LED load, flicker can occur on that LED load. In one example switching power supply, a large electrolytic capacitor may be used to store energy in order to provide a DC voltage to an LED load to decrease the output current ripple. However, power factor correction (PFC) may not be achieved in such an approach, and the service life may be decreased due to the electrolytic capacitor.

DETAILED DESCRIPTION

Figure 1:
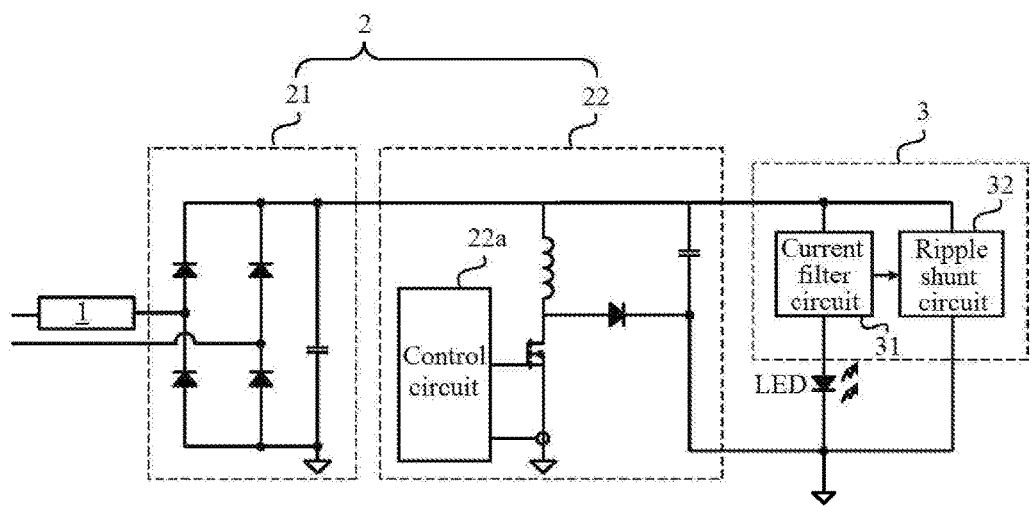
FIG. 1 is a schematic block diagram of a first example LED driver, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

The light-emitting diode (LED) light source has relatively low power consumption and light weight, and is driven by a constant current. In some approaches, a switching converter with a constant current output is generally used to drive an LED load. However, in a case whereby a single-stage switching converter functions as an LED driver, the current output by the switching converter may have a great power frequency ripple, which can result in flickering or LED strobing of the brightness of the LED load along with such a power frequency change. In particular, in a case that a triode for alternating current (TRAIC) dimmer is connected to the previous stage and the dimming angle is relatively small, a significant change in the drive current for the LED load may be caused by fluctuation of the input voltage due to the small output current, thereby resulting in brightness change or flickering that can be seen by human eyes.

In order to eliminate the strobing of the LED load and the flickering of the LED load due to the fluctuation of the input alternating current, a digital circuit may be adopted in order to accurately control the dimming angle and the curve in the half power frequency cycle after rectification. This can accurately control the output current, and a ripple filter circuit may be arranged prior to the LED load. As such, the control process for this type of digital circuit may be relatively complex with a high cost.

In one embodiment, a ripple suppression circuit for suppressing a ripple component in a drive current for an LED load, can include: (i) an output port connected to the LED load; (ii) a current filter circuit connected in series with the output port, and being configured to control the drive current based on an output voltage after a ripple component is filtered out, where the drive current is maintained as substantially stable; and (iii) a ripple shunt circuit connected between a drive current input terminal and a ground terminal, and being configured to shunt the drive current in response to the output voltage, where the output voltage is a voltage output from a previous stage of circuit to the ripple suppression circuit.

Referring now to FIG. 1, shown is a schematic block diagram of a first example LED driver, in accordance with embodiments of the present invention. In this particular example the LED driver can include dimmer 1, LED drive circuit 2, and ripple suppression circuit 3, which are sequentially connected between an alternating current input terminal and an LED load. For example, dimmer 1 may be implemented with a TRAIC. LED drive circuit 2 may include rectification circuit 21 and switching converter 22. In this example, rectification circuit 21 is a full-bridge inverter circuit formed by four diodes and a filter capacitor. Rectification circuit 21 can connect to dimmer 1, and may convert an alternating current chopped by the dimmer into a direct current output therefrom. Depending on different application scenarios and specific considerations of the circuit design, rectification circuit 21 may alternatively be implemented with other types of circuitry, such as a half-bridge rectification circuit.

Switching converter 22 can include a power stage circuit and control circuit 22*a*. In this particular example, the power stage circuit is implemented with a buck-boost topology (BUCK-BOOST). Control circuit 22*a* can control, based on a feedback parameter (e.g., an output current), a power switch of the power stage circuit to be turned on or turned off, to output a stable drive current Id. It should be understood that, depending on different requirements of an input voltage and a driven load, the power stage circuit in switching converter 22 may additionally or alternatively be implemented with other converter topologies (e.g., a buck topology [BUCK], a boost topology [BOOST], and a flyback topology [FLYBACK], etc). Ripple suppression circuit 3 can suppress ripple component Irip in drive current Id for the LED load in order to avoid strobing and flickering of the LED load.

Ripple suppression circuit 3 can include an output port, current filter circuit 31, and ripple shunt circuit 32. The output port can connect to the LED load LED. The output port can include terminals "a" and "b." Current filter circuit 31 can connect in series with the output port, and the drive current may be controlled as stable based on the filtered output voltage without the ripple component, thereby filtering out a ripple in the drive current flowing to the output port. In this example circuit, current filter circuit 31 connect in series with LED load "LED" via the output port to perform filtering on drive current Id, such that current Iled output to the LED load is as stable as possible. Ripple shunt circuit 32 can connect between a drive current input terminal (e.g., an output terminal of the switching converter) and a ground terminal, and may shunt drive current Id in response to voltage drop Vq1 of the current filter circuit.

In this example, current filtering may be performed on the drive current, and the ripple shunt circuit can perform shunting based on the voltage drop of the current filter circuit, such that the ripple in the drive current for the LED load may be suppressed and removed with a relatively simple circuit structure. In this way, flickering of the LED load due to a sudden change or periodic change in the drive current can be substantially avoided, as well as possible strobing or flickering of the LED load, and may operate at a relatively low current with a relatively low cost.

Figure 2:
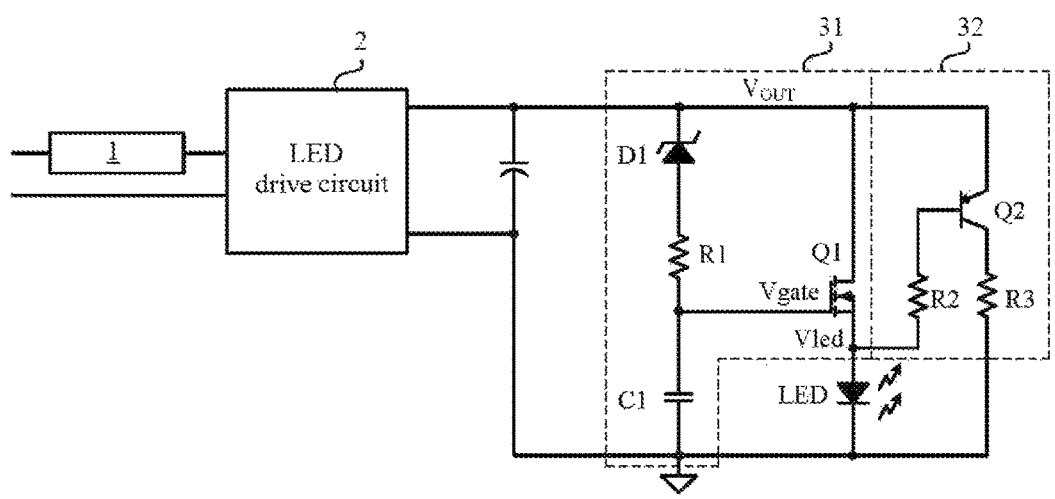
FIG. 2 is a schematic block diagram of a second example LED driver, in accordance with embodiments of the present invention.

Referring now to FIG. 2, shown is a schematic block diagram of a second example LED driver, in accordance with embodiments of the present invention. This particular example LED driver can include dimmer 1, LED drive circuit 2, and ripple suppression circuit 3, sequentially connected between an alternating current input terminal and an LED load. Ripple suppression circuit 3 can include output port, current filter circuit 31, and ripple shunt circuit 32. The output port can connect to the LED load "LED." The output port can include terminals "a" and "b." Current filter circuit 31 can connect between the LED load and a drive current input terminal. Current filter circuit 31 can include a voltage filter circuit and a voltage-controlled current source. The voltage filter circuit can connect between the drive current input terminal and a ground terminal, and may perform filtering on output voltage Vout to output a stable control voltage. The voltage-controlled current source may be controlled through control voltage Vgate. In FIG. 2, the voltage-controlled current source is implemented using transistor Q1 (e.g., a metal oxide semiconductor field effect transistor [MOSFET]), and is arranged on a drive current path. That is, a source and a drain of transistor Q1 can respectively connect to the drive current input terminal and the second terminal "b" of the output port, and transistor Q1 may operate in a linear region.

Control voltage Vgate may be applied to a gate of transistor Q1 in order to control a drain current (e.g., current Iled flowing from the drive current input terminal to the LED load). When control voltage Vgate is stable, current Iled flowing to the LED load "LED" may also be stable. The voltage filter circuit can perform the filtering on output voltage Vout in order to remove a ripple in output voltage Vout. The LED load may be regarded as a load with a constant impedance. When drive current Id has a ripple component, the corresponding output voltage Vout may also have a ripple component. Filtering may be performed on output voltage Vout by the voltage filter circuit in order to filter out the ripple component, and current Iled flowing to the LED load can be controlled based on the filtered voltage without the ripple component, such that current Iled may have substantially no ripple.

In the example of FIG. 2, the voltage filter circuit can include diode D1, resistor R1, and capacitor C1, sequentially connected between the drive current input terminal and the ground terminal. Diode D1 may be implemented with a zener diode. A cathode of diode D1 can connect to the drive current input terminal, and an anode of diode D1 can connect to resistor R1. When output voltage Vout is greater than a predetermined threshold, diode D1 may be broken down and generate a predetermined voltage drop. An RC circuit formed by resistor R1 and capacitor C1 can perform filtering on a remaining portion of output voltage Vout in which the voltage drop of diode D1 is removed, and may output a stable control voltage Vgate. Control voltage Vgate can be a voltage at a common node of resistor R1 and capacitor C1.

After the circuit has started up, output voltage Vout can be relatively high, and capacitor C1 may not be charged, such that that diode D1 is broken down, and capacitor C1 is charged until diode D1 returns to an off state, whereby the circuit enters into a steady state. Thereafter, diode D1 can be in a critical breakdown state, and may be broken down for a short time period in each ripple period, such that capacitor C1 is charged via the drive current input terminal in order to compensate for the voltage loss of capacitor C1 due to a leakage current of transistor Q1. When output voltage Vout fluctuates upward with drive current Id, diode D1 may be broken down. Since the RC circuit formed by resistor R1 and capacitor C1 may have a relatively large time constant, a voltage across capacitor C1 may slowly change, and control voltage Vgate can remain stable.

When output voltage Vout fluctuates downward with drive current Id, diode D1 can be maintained in the off state, such that control voltage Vgate remains constant. In each ripple period, a voltage across diode D1 may approach zero in a time period during which diode D1 is broken down, and the voltage can remain in the vicinity of a breakdown voltage Vd1 at other times. Thus, when output voltage Vout ranges from Vgs+Vled to Vgs+Vled+Vd1, the current flowing the LED load can remain substantially constant. When output voltage Vout changes by an amount more than Vd1, control voltage Vgate can still remain stable due to the relatively large time constant of the RC circuit, and thus current Iled flowing through the LED load may not rapidly change.

Figure 3:
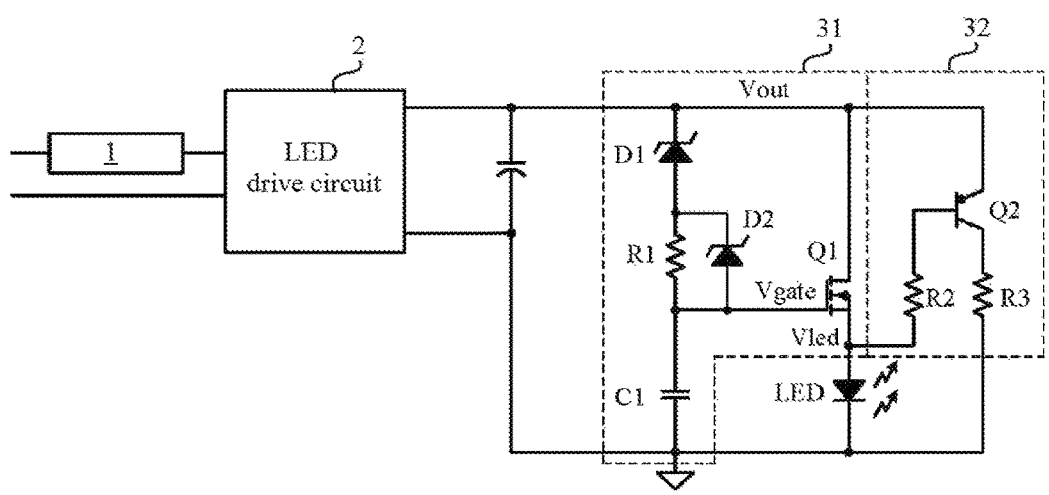
FIG. 3 is a schematic block diagram of a third example LED driver, in accordance with embodiments of the present invention.

Referring now to FIG. 3, shown is a schematic block diagram of a third example LED driver, in accordance with embodiments of the present invention. In this particular example, in order to prevent the circuit from being damaged due to a too high output voltage Vout, diode D2 may be connected in parallel with resistor R1 for protection. Diode D2 may also be implemented with a zener diode. When output voltage Vout is higher than a predetermined protection threshold, a voltage across resistor R1 may be higher than breakdown voltage Vd2 of diode D2. In this case, diode D2 may be broken down, and resistor R1 can be short-circuited, such that control voltage Vgate is equal to Vout−Vd1−Vd2, and increases rapidly with output voltage Vout. Thus, the current flowing through transistor Q1 can be increased, such that output voltage Vout can be reduced.

In this way, a ripple with a small change can effectively be filtered out by the current filter circuit. A ripple in the current may generally change greatly due to jittering of an input alternating current voltage. This type of ripple may be shunted by a ripple shunt circuit, while being suppressed by the current filter circuit. When drive current Id output by LED drive circuit 2 has a ripple component with a relatively change, output voltage Vout may also have a matching ripple. In addition, transistor Q1 can be controlled to output a stable current Iled to the LED load. The LED load may be regarded or modeled as a resistor with a constant resistance. In this case, the voltage drop (e.g., a voltage between the source and the drain) Vq1 of transistor Q1 can be equal to a voltage that is acquired by subtracting voltage drop Vled of the LED load from output voltage Vout. Therefore, voltage drop Vq1 can contain information on the ripple component. Ripple shunt circuit 32 may shunt drive current Id in response to voltage drop Vq1 of current filter circuit 31, in order to effectively shunt the ripple component and maintain normal operation of the circuit.

In FIGS. 2 and 3, ripple shunt circuit 32 can include triode Q2, and resistors R2 and R3. Triode Q2 may include an emitter, a base, and a collector. The emitter of triode Q2 can connect to the drain of transistor Q1. The base of triode Q2 can connect to the source of transistor Q1 through resistor R2. That is, resistor R2 can connect between the base of triode Q2 and the source of transistor Q1. The collector of triode Q2 can connect to the ground terminal through resistor R3. That is, resistor R3 can connect between the collector of triode Q2 and ground. A collector current of the triode may be in direct proportion to a base current of the triode. When a forward voltage is applied between the emitter and the base, a PN junction between the emitter and the base is turned on, and a base current in direct proportion to voltage drop Vq1 may be formed. Thus, the collector current (e.g., a current flowing through resistor R3) may be in direct proportion to voltage drop Vq1 of transistor Q1.

Figure 4:
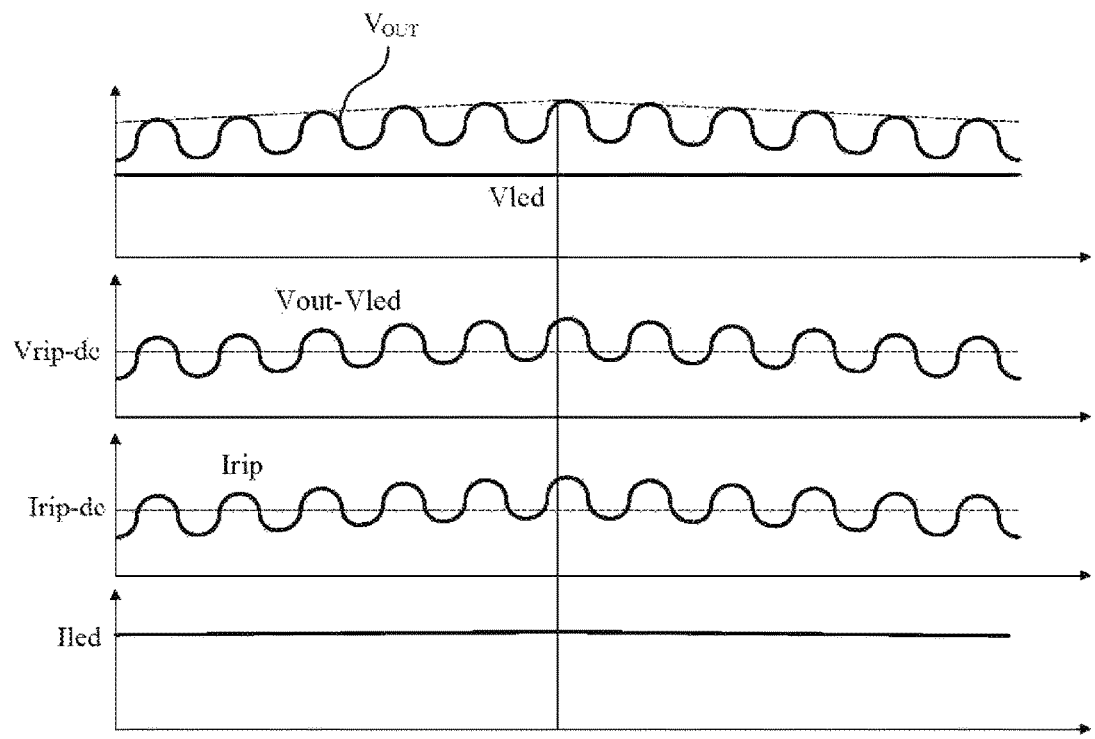
FIG. 4 is waveform diagram of example operation of the LED driver shown in FIG. 3, in accordance with embodiments of the present invention.

Referring now to FIG. 4, shown is waveform diagram of example operation of the LED driver shown in FIG. 3, in accordance with embodiments of the present invention. As shown in FIG. 4, output voltage Vout may have the same ripple as ripple component Irip in drive current Id. Current Iled flowing through the LED load and voltage drop Vled of the LED load can remain substantially constant. Voltage drop Vq1 of transistor Q1 may be equal to Vout−Vled, and may have the same ripple as ripple component Irip in drive current Id. In this example, a parameter of the previous circuit can be set such that voltage drop Vq1 has a direct current component Vrip-dc. Thus, voltage drop Vq1 can remain positive when an input alternating current of the LED driver increases or decreases, and the circuit can suppress the ripple in response to changes of the drive current in different directions. It can be seen from FIG. 4 that a direct current component Irip-dc in drive current Id is substantially the same as current Iled flowing through the LED load.

In this example, filtering may be performed on output voltage Vout in order to remove the ripple component in the output voltage in synchronization with the ripple in the drive current. Also, the voltage-controlled current source can be controlled based on the filtered voltage without the ripple component in order to output a current to the LED load. In this way, no strobing and flickering of the LED load may be caused by the current flowing through the LED load. In addition, the ripple shunt circuit can be controlled to shunt the current in response to the voltage drop. Therefore, when jittering occurs in the input alternating current voltage, most random low-frequency ripple current can be shunted into the bypass current in order to avoid fluctuation of the LED current, thereby avoiding strobing or flickering of the LED load.

Figure 5:
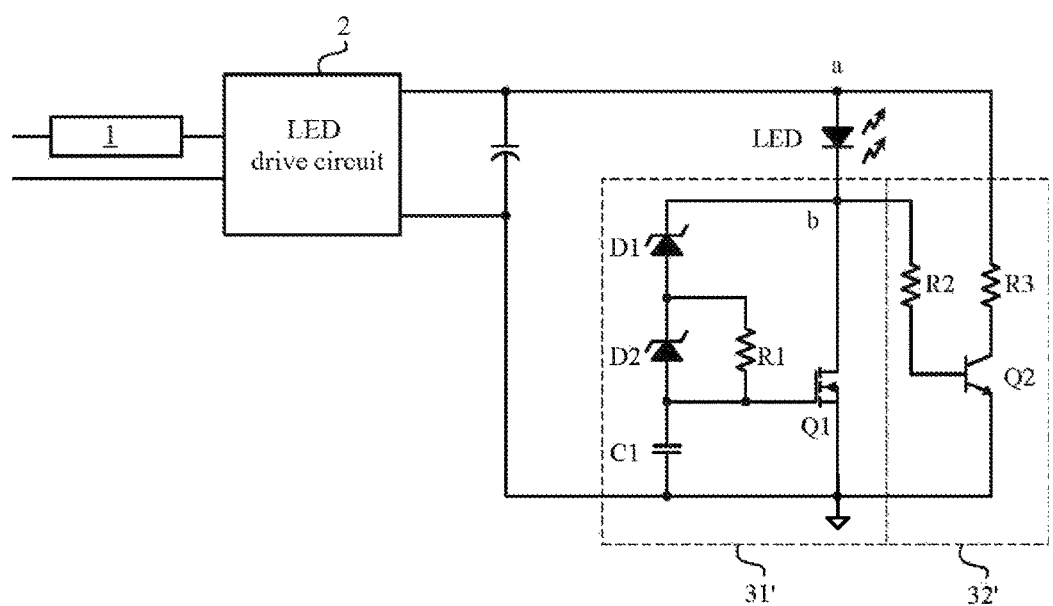
FIG. 5 is a schematic block diagram of yet another example LED driver, in accordance with embodiments of the present invention.

Referring now to FIG. 5, shown is a schematic block diagram of yet another example LED driver, in accordance with embodiments of the present invention. In this particular example, current filter circuit 31' can connect between an LED load "LED" and ground. A voltage filter circuit in current filter circuit 31' can perform filtering on a voltage across transistor Q1. In addition, an emitter of triode Q2 in ripple shunt circuit 32' can connect to the ground terminal, and a base of triode Q2 can connect to a drain of transistor Q1 through resistor R2. The drain of transistor Q1 can connect to a cathode of the LED load through terminal "b" of an output port. Resistor R2 is connected between terminal "a" of the output port and a collector of triode Q2. Here, triode Q2 may control a current flowing through resistor R3 in response to drain-source voltage Vq1 of transistor Q1, in order to shunt a ripple component in drive current Id. Further, current filter circuit 31' can control transistor Q1 to output current Iled without a ripple or a sudden change by performing filtering on the ripple component in voltage drop Vq1, thereby substantially avoiding strobing or flickering of the LED load.

Those skilled in the art will recognize that, while the voltage-controlled current source is implemented with a metal oxide semiconductor field effect transistor in this example, other devices or more complicated circuitry may additionally or alternatively be adopted in order to realize the functions of the voltage-controlled current source. The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A ripple suppression circuit for suppressing a ripple component in a drive current for a light-emitting diode (LED) load, the ripple suppression circuit comprising:
   a) a drive current input terminal coupled to the LED load to provide the drive current from a power stage circuit;
   b) a current filter circuit coupled in series with the LED load between the drive current input terminal and ground, and being configured to filter the ripple component of the drive current, and provide a supply current to the LED load; and
   c) a ripple shunt circuit coupled between the drive current input terminal and ground, and being configured to generate a shunting current in accordance with the ripple component of the drive current, wherein the supply current provided to the LED load is controlled to be substantially constant in order to decrease flicker of the LED load.

2. The ripple suppression circuit of claim 1, wherein the ripple shunt circuit is configured to shunt the drive current in response to a voltage drop of the current filter circuit.

3. The ripple suppression circuit of claim 2, wherein the shunting current of the ripple shunt circuit is in direct proportion to the voltage drop of the current filter circuit.

4. The ripple suppression circuit of claim 2, wherein the ripple shunt circuit is configured as a voltage-controlled current source in response to the voltage drop of the current filter circuit.

5. The ripple suppression circuit of claim 1, wherein the current filter circuit comprises:

a) a voltage filter circuit configured to filter the ripple component, and to generate a control voltage that is substantially stable; and b) a voltage-controlled current source coupled in series with the LED load, and being configured to generate the supply current under control of the control voltage.

6. The ripple suppression circuit of claim 5, wherein:

a) the voltage-controlled current source and the LED load are coupled in series between the drive current input terminal and ground; and b) the voltage filter circuit comprises a first diode, a first resistor, and a first capacitor that are sequentially connected between the drive current input terminal and the ground terminal, wherein the control voltage is generated from a common node of the first resistor and the first capacitor.

7. The ripple suppression circuit of claim 6, wherein the voltage filter circuit further comprises a second diode connected in parallel with the first resistor.

8. The ripple suppression circuit of claim 5, wherein:

a) the LED load and the voltage-controlled current source are coupled in series between the drive current input terminal and ground; and b) the voltage filter circuit comprises a first diode, a first resistor, and a first capacitor that are sequentially connected between two terminals of the voltage-controlled current source, wherein the control voltage is generated form a common node of the first resistor and the first capacitor.

9. The ripple suppression circuit of claim 8, wherein the voltage filter circuit further comprises a second diode connected in parallel with the first resistor.

10. The ripple suppression circuit of claim 5, wherein the voltage-controlled current source comprises a transistor.

11. The ripple suppression circuit of claim 5, wherein the ripple shunt circuit comprises:

a) a triode having an emitter connected to a first terminal of the voltage-controlled current source a base coupled to receive the voltage drop of the current filter circuit through a second resistor; and b) a third resistor coupled in series with a collector of the triode.

12. The ripple suppression circuit of claim 5, wherein said voltage filter circuit is configured as an RC filter network having at least one resistor and one capacitor.

13. An LED driver, comprising the ripple suppression circuit of claim 1, and further comprising:

a) a dimmer;

b) a rectification circuit connected to the dimmer; and c) a switching converter connected to an output terminal of the rectification circuit, wherein the ripple suppression circuit is connected between the switching converter and the LED load.

* * * * *